May 21, 1957

V. H. SCHMIDT 2,792,767

PULSE MODIFIED CAMERA

Filed March 1, 1955

INVENTOR.
VICTOR H. SCHMIDT
BY
ATTORNEYS

May 21, 1957 V. H. SCHMIDT 2,792,767
PULSE MODIFIED CAMERA
Filed March 1, 1955 2 Sheets-Sheet 2
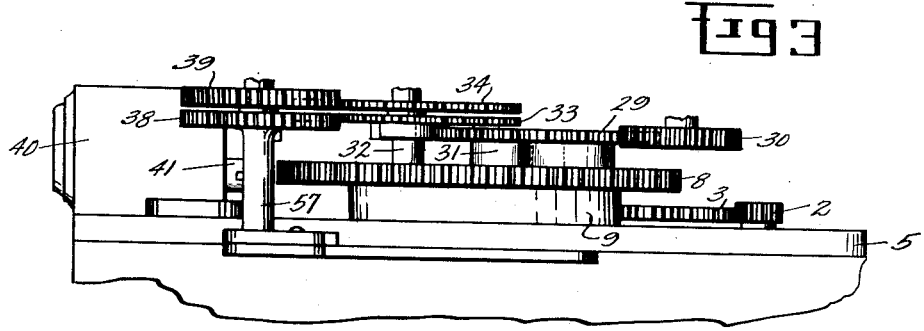
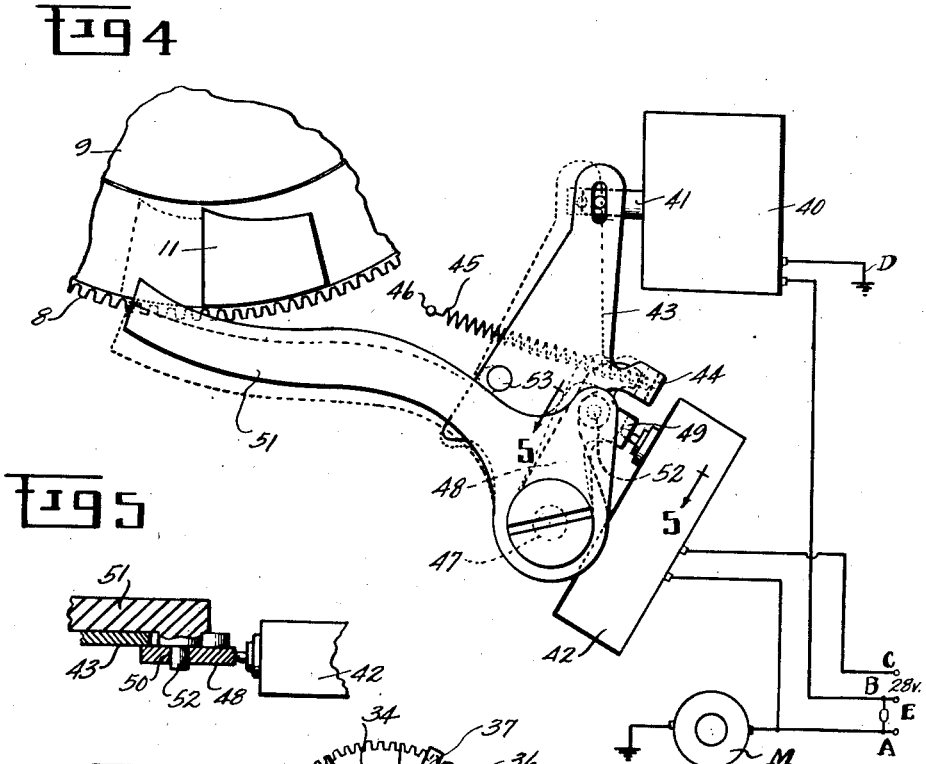
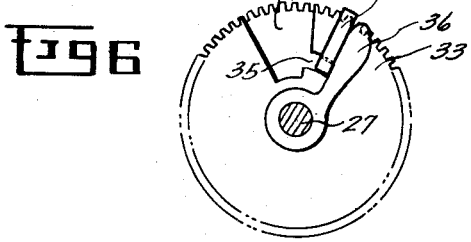
INVENTOR.
VICTOR H. SCHMIDT

United States Patent Office 2,792,767
Patented May 21, 1957

2,792,767

PULSE MODIFIED CAMERA

Victor H. Schmidt, Klickitat, Wash.

Application March 1, 1955, Serial No. 491,555

4 Claims. (Cl. 95—12.5)

(Granted under Title 35, U. S. Code (1952), sec. 266)

The invention described herein may be manufactured and used by or for the United States Government for governmental purposes without payment to me of any royalty thereon.

This invention relates to an improvement and novel modification of cameras such as are manufactured to provide a continuous series of exposures within a predetermined cycle of operation. The novel modification provided by subject invention enables a simple and positive pulse modification thereof in a minimum period of time as well as at a minimum expense to readily provide such cameras with a much wider range of application and extreme versatility. This invention is particularly important as applied to high speed cameras which have a fast cycling rate. The particular single application and embodiment of the invention shown and described herein relates to aerial type cameras such as are used for sequential aircraft reconnaissance to enable the cycling rate of such camera to be varied within the cycling range in accordance with aircraft speed, altitude, and percent overlap desired in successive pictures.

While pulse modification of cameras has been accomplished previously in the prior art by various expedients, no one or combination of such expedients presents such a simple and positive control as the present system or so easily enables the versatility in range of application of a camera so modified.

In the practical embodiment of the invention shown and described herein an aerial camera which is of a high speed type having a fast cycling rate is simply modified by the interposition of a pulse arm in positive interrelation to the camera main drive gear and the control system of the camera drive motor, which control system is arranged to include a solenoid and microswitch, in a novel manner to enable a simple adaptation of the camera as to control the cycling rate thereof within its range without affecting its basic capability to function at high speed at its rated cycling rate to provide a continuous sequence of exposures by the mere replacement of the pulse arm. By the novel pulse arm control, the drive motor is actuated by a single pulse which results also in the energization of the solenoid and microswitch which sets the pulse arm so that upon driving the film drive means through the main drive gear to introduce a new frame and actuating the curtain mechanism in timed sequence thereto by the same means on the main drive gear, immediately following a single exposure cam means on the main drive gear engages the pulse arm in its set position to break the circuit through the microswitch to deenergize both the microswitch and the solenoid, so that, by controlling the pulse timing to the system the cycling rate of the camera with its novel modification can be varied within its rated range.

The primary advantage resulting from the invention is the simplicity with which a camera of limited application may be modified to expand its utility and, moreover at a minimum of expense.

An object of this invention is to provide a simple novel pulse modification system for cameras to expand their range of application so as to provide greater versatility for such cameras.

Another object of this invention is to provide a highly simplified novel pulse modification system for aerial cameras.

An additional object of this invention is to provide an improved simplified electro-mechanical control apparatus enabling pulse modification of aerial cameras of small size, high shutter speed and fast cycling rate.

A further object of the invention is to provide a simplified pulse modification system for a camera by providing a pulse arm so related to the main drive gear of a camera and the control for the drive motor in sequential fashion that the motor drive to the main gear will be interrupted upon the taking of a single picture.

Other objects and advantages of the invention will become readily apparent to those versed in the art from the following description taken in conjunction with the accompanying drawings wherein:

Fig. 3 is a cross sectional view taken on line 3—3 of Fig. 1.

Fig. 4 is a fractional view, partially diagrammatic, of the novel pulse modification apparatus.

Fig. 5 is a section on line 5—5 of Fig. 4 showing the connection of the pulse arm to the microswitch arm.

Fig. 6 is a detail showing of the shutter control gears.

Figure 1:
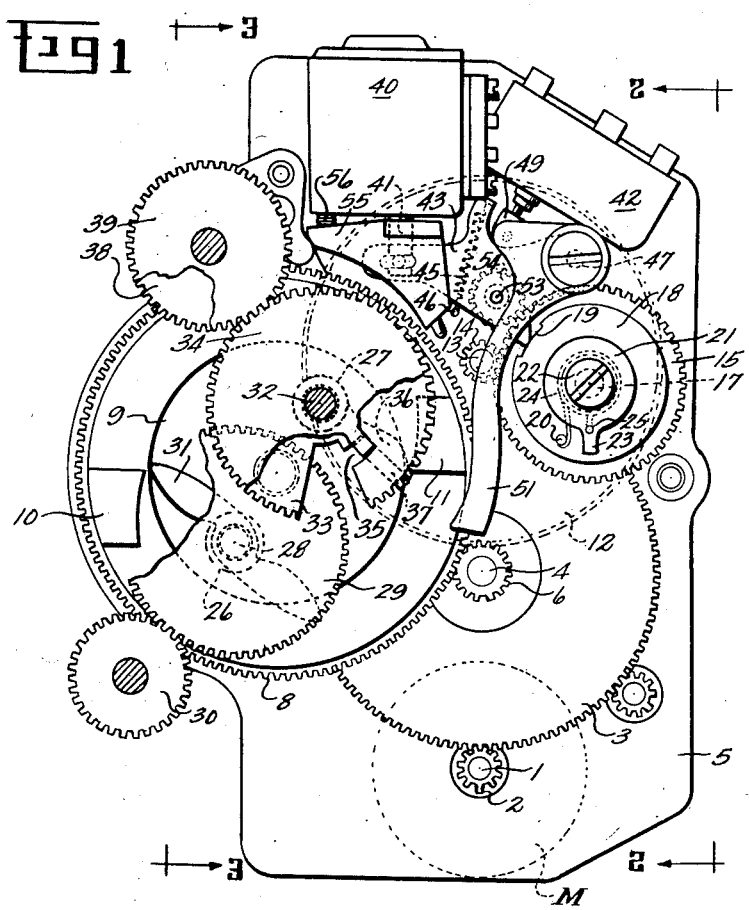
Fig. 1 is a plan view of the invention apparatus as applied to an aerial type camera.
Figure 2:
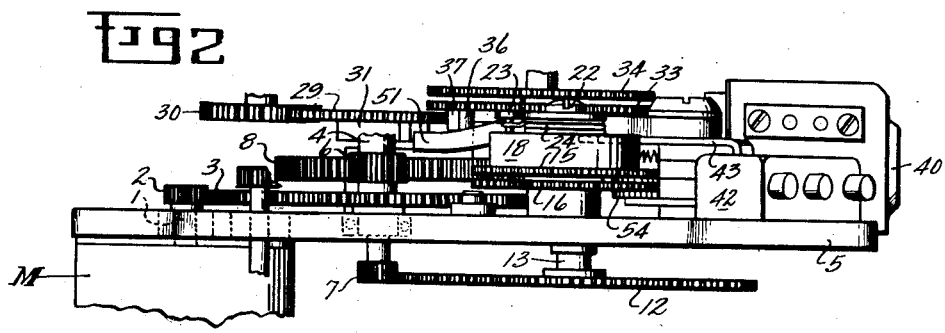
Fig. 2 is a cross sectional view taken on line 2—2 of Fig. 1.

As can be seen with reference to the drawings, the particular drive arrangement of the camera in which the practical embodiment of the invention herein is incorporated is as follows: A motor M is arranged with a drive shaft 1 extending therefrom, the drive shaft having a drive pinion 2 secured thereto at its extremity. Geared to the pinion 2 is an intermediate gear 3 of a substantially larger size mounted on a shaft 4 which shaft is rotatably mounted in a bearing in support plate 5. Connected to the shaft 4 and spaced on either side of the gear 3 and plate 5 are pinions 6 and 7. The upper drive pinion 6 is in driving relation to a main drive ring gear 8 which is mounted for rotation about a bearing stud 9 fixed to the plate 5. Integrally connected to the outer face of the ring gear are cam lugs 10 and 11 equidistantly spaced thereon adjacent the periphery of the ring gear and projecting from the face thereof. In driven relation to the pinion 7 is a large gear 12 fixed to a shaft 13 extending through the plate 5 and rotatable in a bearing relative thereto. On the other side of plate 5 a pinion 14 is fixed to the shaft 13 for rotation therewith.

In the particular drive mechanism of the camera shown herein the pinion 14 is associated with the overrun system consisting of split gear elements 15 and 16 which are mounted for rotation relative to a shaft 17 fixed to the base plate 5. The gear element 15 has a hub portion 18 integral therewith. The hub portion 18 has a notch 19 in its periphery as well as a pin 20 integral therewith and extending upwardly from its hub face. A ring member 21 is secured to shaft 17 by a screw 22 and has a lug 23 extending from its periphery. A coil spring 24 is connected at one end to the pin 20 and wrapped around shaft 17 to engage a hole 25 in the lug 23 to afford a biasing action on gear element 15. The overrun system gearing affords no part of the present invention and the functional aspect of such system is eliminated by the subject invention as will be described herein but the disclosure of its components is necessary to point out the simplicity of the novel modification.

Fixed in the bearing stud 9 are bearings 26 and 27. Mounted for rotation in bearing 26 is the film drive shaft 28. Fixed to shaft 28 is gear 29 geared to a film drive gear 30. Since further detail of the film drive system is in a manner well known in the art and is not pertinent to the invention no further discussion thereof appears necessary at this time. It is sufficient for the purpose of disclosure of the subject invention that the movement of the film frames for exposure is through gear 29 to gear 30.

Fixed to the undersurface of gear 29 is a symmetrical cam element 31 having opposed cam heads 180° apart. The shaft 28 extends through the central axis of the cam element 31. As the gear 29 is located, the cam element 31 is in the path of lugs 10 and 11. Accordingly as the main drive gear is rotated the lugs 10 and 11 in timed sequence will respectively engage the respective cam heads of cam element 31 to drive the film drive gears 29 and 30 sufficiently to advance a succeeding frame for exposure.

Mounted for rotation in bearing 27 is a shaft 32 having split gear elements 33 and 34 mounted thereon. The inner gear element 33 has a sector type slot 35 therein as may be clearly seen in Fig. 6 of the drawings and a depending lug 36 integral therewith at the bottom of the gear element 33 adjacent the slot 35 which lug has a rounded cam surface. This inner gear element is fixed for rotation relative to shaft 32 in any suitable manner. The outer gear 34 is fixed to the shaft 32 for rotation therewith. In addition an L-shaped lug 37 is formed to depend from the inner surface of the gear element 34 through the slot 35 in the inner gear element 33 to act as a limit stop for the relatively rotatable gear element 33 cooperating with the cam element 36 thereon.

Mounted on the base plate 5 is an adjustable plate from which extends a shaft 57. Gear element 38 is mounted on shaft 57 for rotation relative thereto and to mesh with gear element 33. A further gear element 39 in mesh with gear element 34 together with gear element 38 affords a driving and driven connection to a spring loaded shutter curtain whereby shutter control for exposure of the film may be effected by control of gear elements 33 and 34 through engagement of cam 36 by the cam lugs 10 and 11 in timed relation to movement of the film by the cam lugs 10 and 11. The details of the control of the curtain and exposure of the film not being pertinent to the invention herein need not be discussed.

Mounted on base plate 5 is a solenoid 40 which has a plunger element 41 extending therefrom having a slot in its outer extremity. Adjacent the solenoid on the base plate 5 is a microswitch 42, normally open, having a push button control. Pivotally connected to the plunger element 41 by a pin transversely of the slot therein is a solenoid arm 43 having a projecting lug portion 44. A coil spring 45 connected at one end to the end of the lug portion 44 and at the other end to a fixed pin 46 mounted in the base plate 5 continuously biases the plunger element 41 outwardly to a deenergized position. A mounting shaft 47 extends from base plate 5 and serves to pivotally mount a microswitch arm 48 having a depending lug portion 49. The solenoid arm is also pivotally mounted on shaft 47 spaced from the microswitch arm. The microswitch arm has a hole 50 therein adjacent its lug portion. The particular novel inventive concept effected by subject invention is accomplished by a pulse arm 51 mounted on shaft 47 outwardly of the solenoid arm for pivotal movement thereon and retained by a screw extending through an aperture in arm 51 to engage the shaft 47. The pulse arm whose outline may be seen in the drawings has a pin 52 depending therefrom to engage in hole 50 in the microswitch arm when in assembled relation to establish an operative relationship therebetween with the outer extremity of the arm arranged adjacent the main drive gear.

As can be seen from Fig. 4 of the drawings the pin 52 in assembled relation of the pulse arm is in a location adjacent the edge of the solenoid arm in a recess formed by the projecting lug 44. Also extending through a hole 54 in the solenoid arm is a shaft 53 on the lower end of which an idler gear is mounted and adapted for engagement with overrun gear elements 15 and 16.

The method of operation of the modified apparatus noting Fig. 4 of the drawings is as follows: An electrical pulse is delivered to the circuit through lines A and B to energize the drive motor and to simultaneously energize the solenoid, the plunger 41 being drawn in to rotate the solenoid arm about its pivot to energize the pulse arm pin to cam the associated microswitch arm 48 against the microswitch button to close the circuit in closing the microswitch thereon. There is a jumper E put in the circuit by the said invention so that the drive motor and solenoid are energized immediately at the beginning of the initiation pulse. As the microswitch is closed, 28 volt D. C. power is supplied directly from C through the microswitch to the drive motor and through A and the jumper E to the solenoid 40 to cause the drive motor M and the solenoid 40 to remain energized after the end of the initiation pulse. The main drive gear being actuated by motor M, the lug cam 10 thereon engages the cam element 31 to rotate gear 29 to drive film drive gear 30 which as the main drive gear rotates presents another frame for exposure. Before the film movement is quite complete the cam 11 on the main drive gear engages the cam 36 which engages the L-shaped lug on gear element 34 to rotate the gear element 34 and drive the curtain drive gear element to wind the curtain to charge the spring thereon for exposure. As the cam element 36 is released by the cam lug 11 it trips the shutter since there is no longer a drive through gear 34 to the curtain. The spring load on the curtain as it is released will also cause gear elements 33 and 34 to return to their original position, this time in the path of cam lug 10. As the exposure is made, the pulse arm 51 is engaged by the cam lug 11 to rotate it counterclockwise and since the pin 52 engages the microswitch arm the arm is also rotated counterclockwise with the pin 52 engaging the solenoid arm therebetween and the microswitch arm pivots away from the microswitch pulling the plunger 41 out against the solenoid's magnetic field to open the microswitch which has been closed and thus open the control circuit and deenergize the solenoid 40 and drive motor M so that only a single picture is taken at the single pulse and then the system is deenergized. To reenergize the circuit another electrical pulse is provided to energize drive motor M and solenoid 40 to cause the pulse arm to be drawn back into the path of the cam lug 10 as the solenoid plunger rotates the solenoid arm and the arm engages the pin of the pulse arm connected to the microswitch arm to rotate the microswitch arm and pulse arm together to close the microswitch.

The camera mechanism in the embodiment of the invention shown and described can be easily adapted to perform at its rated capacity and in its normal manner by simply unscrewing the screw which retains the pulse arm to shaft 47, removing the pulse arm and replacing the screw.

The simplicity and effectiveness of the invention can readily be seen in the particular practical embodiment of the invention shown herein by the novel pulse arm control system which is easily applied and removed from a camera drive mechanism. While the novel modification is applied to a particular camera mechanism herein in a particular manner other applications and modifications of the novel invention will be readily apparent to those versed in the art from the disclosure herein and such are considered within the scope of the invention.

What is claimed is:

1. In a sequence exposure camera control means, a support plate, a main drive gear journalled on said support plate having circumferentially spaced abutments thereon, a drive motor carried by said support plate for rotating said main drive gear, a film drive means and a shutter control means carried by said support plate, means connected between said main drive gear, said shutter control means and said film drive means for driving said shutter control means and said film drive means in timed relation, pivot means on said support plate, a microswitch control arm and solenoid actuator arm pivoted on said pivot means in superimposed relation, a solenoid carried by said support plate and connected to said solenoid actuator arm for actuation thereof to control said drive motor, a normally open microswitch mounted on said support plate adjacent said microswitch control arm, said microswitch and solenoid connected in an energizing circuit with said drive motor, a pulse arm pivotally mounted on said pivot means in superimposed relation to said solenoid actuator and microswitch control arms connecting means between said pulse arm and said microswitch control arm for movement thereof in one direction by said solenoid control arm and movement in the opposite direction by said pulse arm, said pulse arm having a camming end disposed for displacement into the path of said circumferentially spaced abutments on said main drive gear during rotation thereof, when said solenoid is energized, said spaced abutments impinging said camming end of said pulse arm to displace the same out of the path of said abutments to rotate said microswitch actuator plate to disengage said microswitch to open said energizing circuit to said solenoid through said microswitch and deenergize said drive motor.

2. In a sequence camera control means, a support, a main drive gear thereon, driving cams on said drive gear, a film drive gear driven by said main drive gear, a shutter curtain control gear disposed in driving relation with said main drive gear for driving said film drive gear and said shutter curtain control gear in timed relation to said main drive gear relative to the rotative positions of said driving cams, a drive motor on said support connected for driving said main drive gear, a solenoid fixed relative to said support, an operating circuit for said solenoid, a microswitch carried by said support and connected in said circuit intermediate said motor and said solenoid, a pulse arm pivotally mounted on said support for swinging movement into the path of movement of said driving cams to be cammed thereby out of the last said path, connecting means between said pulse arm and said microswitch for deenergizing said microswitch when said pulse arm is cammed out of said path of said abutment means, connecting means between said pulse arm, said microswitch, and said solenoid for closing said microswitch to energize said solenoid and swing said pulse arm into said path of said abutment when said solenoid is initially energized, circuit means to initially energize said solenoid, and means normally urging said solenoid and pulse arm to inoperative position.

3. In a single cycle motor control means for an aerial camera, a support, a main drive gear journalled on said support, equally spaced drive lugs on said main drive gear, a motor for rotating said main drive gear, a film drive gear on said support disposed in driving relation with said main drive gear through said lugs, a shutter control gear on said support, disposed in driving relation with said main drive gear through said lugs in timed relation to said film drive gear to present film for exposure in predetermined timed relation to the actuation of said shutter control gear, a solenoid disposed in fixed relation to said support, a normally open microswitch disposed in fixed relation to said solenoid in series with said solenoid, a pulse arm pivotally mounted on said support at one side of said main drive gear, said pulse arm having an extension movable by said solenoid into the path of movement of said lugs during rotation of said main drive gear upon energization of said motor including means connected between said solenoid and said microswitch, and engageable by said pulse arm when said solenoid is energized to close said microswitch to energize said motor and swing said pulse arm extension into the path of movement of said lugs on said main drive gear, whereby rotation of said main drive gear causes one of said camming lugs to swing said pulse arm out of the path of said lugs to cause said microswitch to open and deenergize said solenoid to interrupt the circuit to said motor.

4. In a single cycle pulse control means for an aerial camera, a main driving gear having substantially diametrically opposite camming lugs adjacent its periphery, film drive means and shutter control means operable by said main drive gear in timed sequence, motor means operatively connected to said main drive gear for driving the same including an energizing circuit, normally open motor control solenoid means and normally open microswitch means in said circuit for operating said motor when said solenoid is energized and said microswitch is closed, circuit control means for closing said circuit and energizing said motor and solenoid when said solenoid is energized, a pulse arm pivoted adjacent said solenoid and microswitch and movable in one direction to deenergize said microswitch and render said solenoid means inoperative, means normally urging said pulse arm in said one direction, said pulse arm including a camming lever portion movable into the path of movement of said camming lugs when said pulse arm is moved in the opposite direction, and operating connection between said pulse arm and said solenoid for moving said pulse arm in said opposite direction when said solenoid is energized, to close said microswitch, whereby said camming lugs engage said camming lever portion during rotation of said main drive gear to swing the same to deenergize said microswitch and deenergize said solenoid to interrupt rotation of said motor and said main drive gear upon predetermined rotative movement thereof.

References Cited in the file of this patent
UNITED STATES PATENTS

| | | |
|---|---|---|
| 1,612,860 | Fairchild | Jan. 4, 1927 |
| 1,817,182 | Fairchild | Aug. 4, 1931 |
| 2,633,783 | Laval | Apr. 7, 1953 |